Feb. 20, 1962  J. Z. DE LOREAN ET AL  3,021,715
MOTOR VEHICLE ENGINE STARTING APPARATUS
Filed March 28, 1960  3 Sheets-Sheet 1

INVENTORS
John Z. DeLorean
George B. Shaw
BY Brooks H. Short

C. R. Meland
Their Attorney

Feb. 20, 1962   J. Z. DE LOREAN ET AL   3,021,715
MOTOR VEHICLE ENGINE STARTING APPARATUS
Filed March 28, 1960   3 Sheets-Sheet 3

INVENTORS
John Z. DeLorean
George B. Shaw
Brooks H. Short
BY
C. R. Meland
Their Attorney 3,021,715
MOTOR VEHICLE ENGINE STARTING
APPARATUS
John Z. De Lorean, Birmingham, Mich., and George B. Shaw and Brooks H. Short, Anderson, Ind., assignors to General Motors Corporation, Detroit, Mich., a corporation of Delaware
Filed Mar. 28, 1960, Ser. No. 18,089
3 Claims. (Cl. 74—7)

This invention relates to starting apparatus for cranking the internal combustion engine of a motor vehicle.

The present trend in motor vehicles has been to lower the vehicle as much as possible. One of the problems encountered in this general lowering has been to provide sufficient space for the comfort of the vehicle passengers. This lowering has made the drive shaft tunnel and transmission hump problem particularly acute in that as the automobile is lowered, these parts become more prominent. In order to solve the space problem described, it is proposed to mount the transmission in the rear of the vehicle with the engine being mounted in the front. The engine preferably has no flywheel and is connected directly with the transmission through a drive shaft.

The present invention is concerned with the starting apparatus for a vehicle having a rear mounted transmission, and has as one of its objects the provision of a starting arrangement wherein a starting motor is mounted on the transmission and cranks the engine through the transmission and drive shaft. It will be observed that with this arrangement the normally front mounted starter and transmission no longer take up much needed passenger compartment space.

Another object of this invention is to provide a starting apparatus including a starter mounted on a transmission housing and wherein the starter has a pinion that meshes with a ring gear of relatively small diameter located within the transmission housing, and further wherein gearing is provided between the starting motor shaft and pinion for providing sufficient torque to crank the small diameter ring gear.

A further object of this invention is to provide a starting arrangement wherein the engine is cranked through a rear mounted hydraulic transmission and a drive shaft connected with the engine, and further wherein the transmission has a rotatable fluid coupling member that is fitted with a ring gear and wherein a shiftable pinion meshes with this ring gear when the engine is being cranked.

Still another object of this invention is to provide a starter that is compact in axial length. This object is carried forward by providing an arrangement wherein the nose casting that houses the shiftable pinion extends substantially coextensively with the starting motor rather than being mounted on the end of the motor as in conventional practice.

Further objects and advantages of the present invention will be apparent from the following description, reference being had to the accompanying drawing wherein preferred embodiments of the invention are clearly shown.

Figure 1:
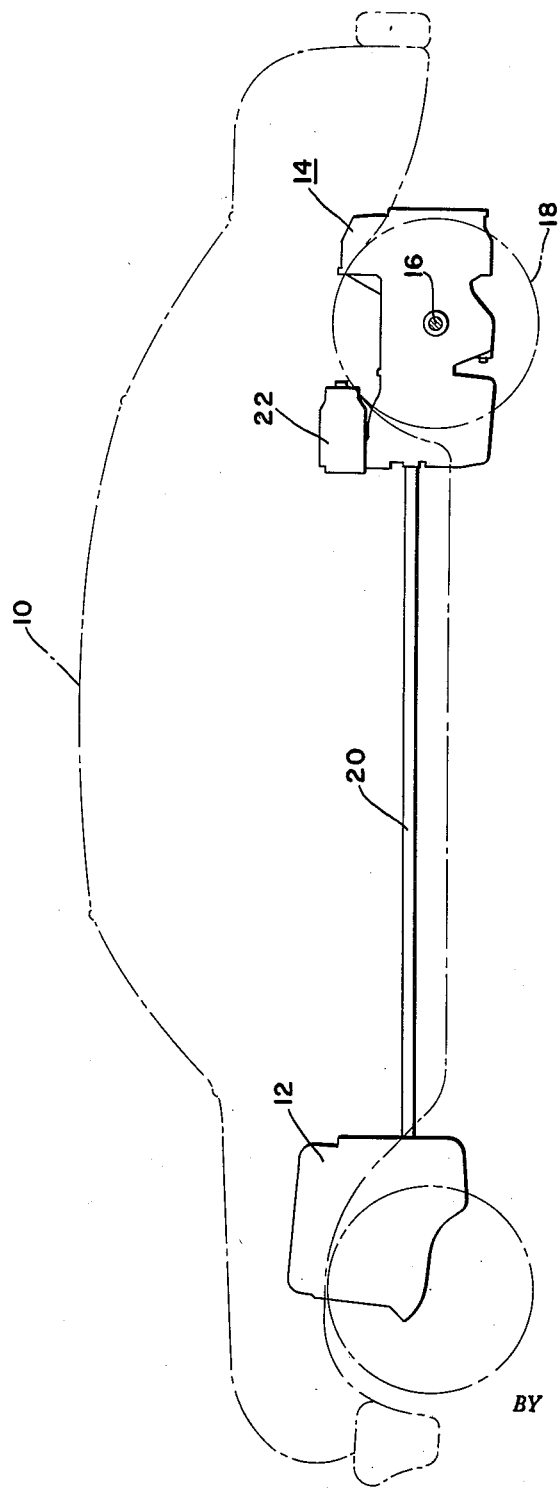
FIGURE 1 is a side view of a motor vehicle fitted with the starting arrangement of this invention.

Referring now to the drawings and more particularly to FIGURE 1, the reference numeral 10 designates a motor vehicle which in this instance is a passenger car. The motor vehicle has an engine 12 mounted at the front end thereof and has a transmission generally designated by reference numeral 14 mounted at the rear end thereof. The transmission has cross shafts 16 which are connected with the rear wheels 18 to transmit driving power thereto. The engine 12 has no flywheel and is connected directly with the transmission 14 through a drive shaft 20. A starting motor generally designated by reference numeral 22 is supported by the housing of transmission 14 and as will become more readily apparent hereinafter operates to crank the engine 12 through the transmission 14 and the drive shaft 20. The transmission 14 is of the automatic hydraulic type taking its input power from the shaft 20 and supplying output power to the wheels 18.

Figure 2:
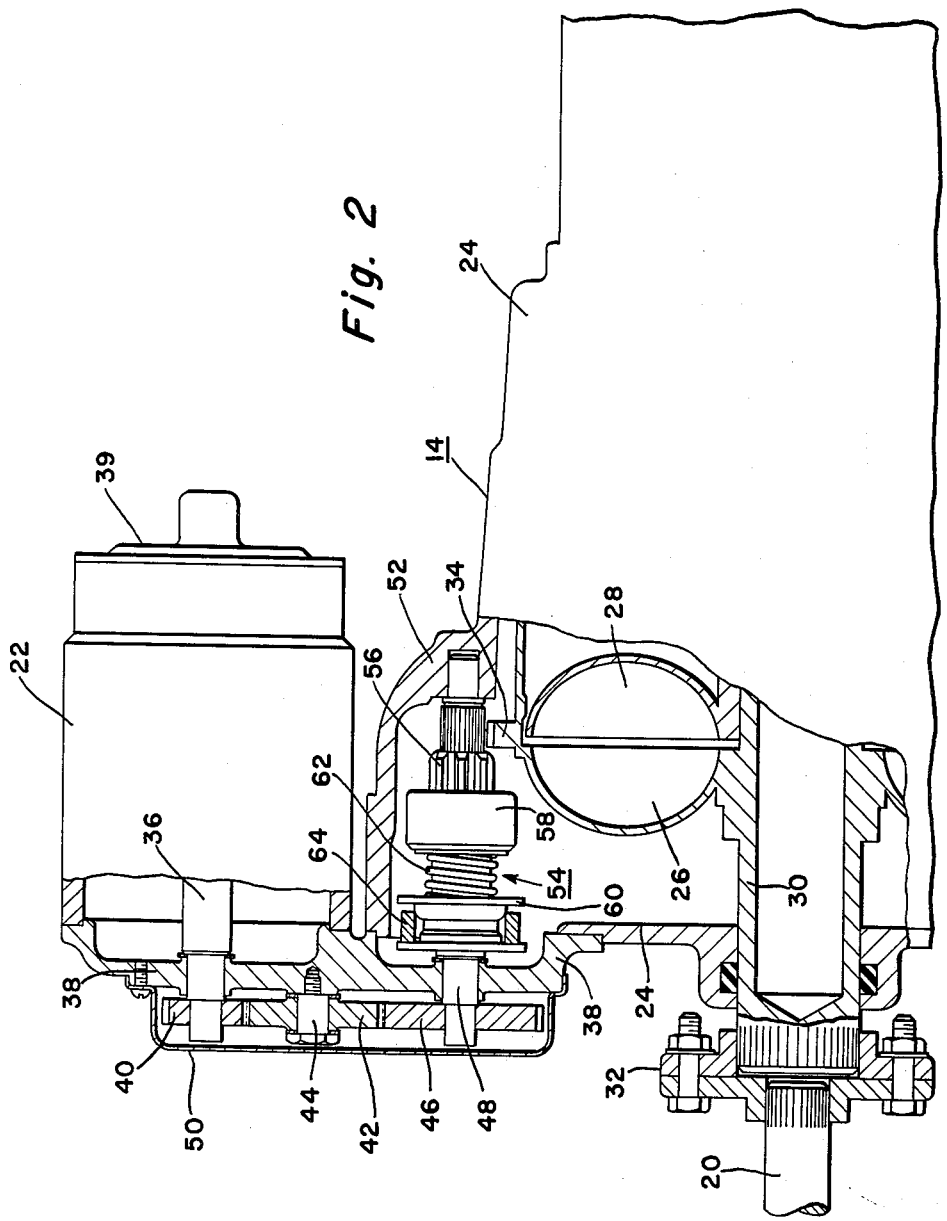
FIGURE 2 is an enlarged view of a portion of the apparatus illustrated in FIGURE 1 showing the connection of the starting motor with a ring gear located within the transmission housing.

Referring now to FIGURE 2, a portion of the transmission and starting arrangement is illustrated in section and in a greater scale in order to show how the starting arrangement cranks the engine 12. In FIGURE 2, the reference numeral 24 designates a transmission housing. The automatic hydraulic transmission has a torus 26 and a torus 28, the torus 26 being connected with a shaft 30 which is in turn connected with drive shaft 20 through a coupling 32. The members 26 and 28 form fluid coupling members for the transmission 14, and it is seen that the torus 26 will be driven from the engine through the shaft 20 and will cause the transmission to supply output power to the wheels 18 of the motor vehicle. The torus 26 is fitted with a ring gear which is designated by reference numeral 34.

The transmission housing 24 carries a starting motor apparatus which includes a starting motor 22 having an armature carried by the shaft 36. The starting motor has the usual field windings which are not illustrated and the shaft 36 is journalled in a front end frame or casting designated by reference numeral 38 and rear end frame or casting 39. The shaft 36 drives a gear 40 which is in mesh with a gear 42 that is journalled for rotation on shaft 44. The gear 42 is in turn in mesh with a gear 46 which drives a shaft 48. The gears 40, 42 and 46 are enclosed by a housing 50, it being understood however that the single casting 38 might be formed to take the place of housing 50 and in such an arrangement, the gears 40, 42 and 46 would be mounted interiorly of the housing 38 and the housing 50 would then not be needed.

Figure 4:
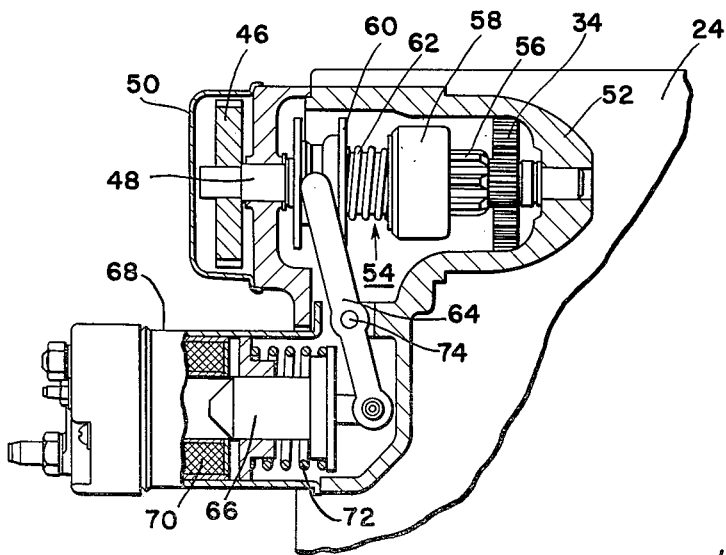
FIGURE 4 is a sectional view taken along line 4—4 of FIGURE 3.

The shaft 48 is journalled for rotation in the end casting 38 and in a nose casting or housing 52 which forms a part of the transmission housing. The shaft 48 carries a conventional starter drive designated in its entirety by reference numeral 54 and including a pinion 56, an overrunning clutch 58, a collar 60 and a spring 62 interposed between the collar 60 and the overrunning clutch 58. The starter drive 54 is shifted axially along the shaft 48 by a shifting fork 64 which is illustrated in greater detail in FIGURE 4. The shifting fork 64 is connected with an armature 66 of a solenoid 68 having a coil winding 70. A spring 72 normally urges the shifting fork 64 counterclockwise around the pivot point 74 illustrated in FIGURE 4 to hold the pinion 56 out of mesh with the ring gear 34. When the coil winding 70 is energized, the starter drive 54 is shifted axially along the shaft 48 and the pinion 56 becomes meshed with the ring gear 34. It is understood, of course, that the starter drive 54 has a splined connection with the shaft 48 so that the pinion 56 will be rotated when the shaft 48 is rotated.

Figure 3:
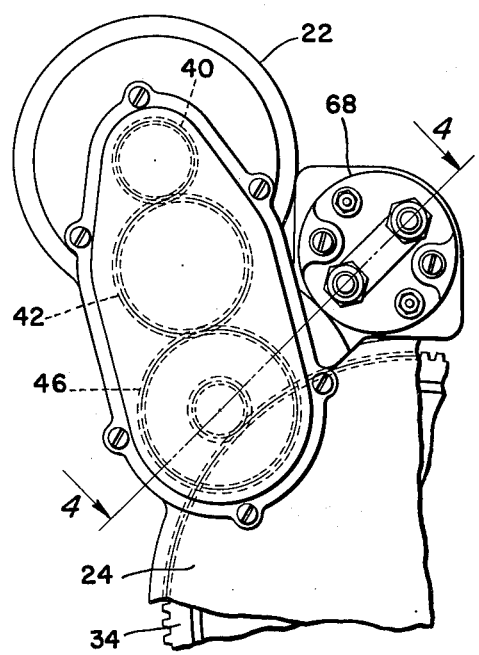
FIGURE 3 is an end view of a portion of the apparatus illustrated in FIGURE 2.

It can be seen from FIGURE 3 that the gear 42 is of larger diameter than the gear 40 and that the gear 46 is slightly larger in diameter than the gear 42. It thus is apparent that when the starting motor 22 is energized, the gear 40 will drive the shaft 48 through the intermediate gears 42 and 46. It is also apparent that this gearing provides a speed reduction and provides sufficient torque to crank the engine 12 through the small diameter ring gear 34.

In the operation of the starting arrangement of this invention, when the solenoid 68 is energized, the shifting fork 64 is pivoted around pivot point 74 and the pinion 56 is caused to be driven into mesh with the ring gear 34. The armature 66 may operate a pair of switch contacts not shown which then complete a circuit for the starting motor 22 to cause the pinion gear 56 to be rotated. This rotation as has been described hereinbefore is through gears 40, 42 and 46, and with the pinion gear in mesh with the ring gear 34, the ring gear will be rotated. Rotation of the ring gear 34 will cause the torus 26 to rotate, causing the shafts 30 and 20 to rotate and thus causing a cranking of the engine 12. When the engine starts, the solenoid 68 and starting motor 22 are deenergized, the spring 72 serving to pull the pinion 56 out of mesh with the ring gear 34. Power will now be supplied to the transmission 14 via the drive shaft 20, the drive shaft driving the torus 26 to cause motive power to be transferred to the rear wheels 18 of motor vehicle.

It can be seen that with the starting arrangement of this invention, the flywheel housing and transmission housing are completely removed from the front end of the vehicle as is the starting apparatus for cranking the internal combustion engine. It also can be seen that the starting apparatus takes up less axial space than the conventional type for the reason that the nose casting 52 extends substantially axially coextensively with the starting motor 22. Thus, in a conventional installation, the nose casting is attached to the end of the starting apparatus.

While the embodiments of the present invention as herein disclosed, constitute a preferred form, it is to be understood that other forms might be adopted.

What is claimed is as follows:

1. Starting apparatus for cranking an internal combustion engine comprising, a support, an electric starting motor having a housing secured to said support, a nose housing secured to said support and extending therefrom in the same direction as said starting motor, an armature shaft having one end thereof journalled for rotation in said support, a second shaft journalled for rotation in said support and said nose housing, the longitudinal axis of said armature shaft being parallel to the longitudinal axis of said second shaft and spaced therefrom, a starter drive carried by said second shaft including a pinion shiftable into engagement with a ring gear, and gearing connecting said armature shaft and said second shaft disposed closely adjacent said support.

2. Starting apparatus for cranking an internal combustion engine comprising, a support member, a starting motor including a housing and an armature shaft secured to said support member and extending therefrom in one direction, a nose housing engaging said support and extending therefrom in the same direction as said starting motor, a second shaft journalled for rotation in said nose housing and said support member, a starter drive including a pinion shiftable along said second shaft and rotatable therewith, a plurality of gears connecting said armature shaft with said second shaft disposed closely adjacent said support member, and a solenoid having an armature for shifting said starter drive along said second shaft, the longitudinal axis of said armature shaft, said second shaft and said solenoid armature being parallel and spaced from each other.

3. Starting apparatus for cranking an internal combustion engine comprising, a support plate, an electric starting motor secured to said support plate and extending therefrom in one direction, a nose housing engaging said support plate and extending therefrom in the same direction as said starting motor, an armature shaft for said electric starting motor having one end thereof journalled for rotation in said support plate, a second shaft journalled for rotation in said support plate and said nose housing, a starter drive carried by said second shaft, a solenoid for shifting said starter drive, and gearing connecting said armature shaft and said second shaft, the longitudinal axis of said armature shaft being parallel to and spaced from the longitudinal axis of said second shaft.

References Cited in the file of this patent

UNITED STATES PATENTS

| 799,851 | Hood | Sept. 19, 1905 |
| 1,259,829 | Brown | Mar. 19, 1918 |
| 1,364,854 | Hartford | Jan. 4, 1921 |
| 2,482,534 | Antonidis | Sept. 20, 1949 |
| 2,509,361 | McCreary | May 30, 1950 |
| 2,770,971 | Doane | Nov. 20, 1956 |

FOREIGN PATENTS

| 904,851 | France | Nov. 19, 1945 |
| 519,246 | Italy | Mar. 11, 1955 |